455-607 AU 233 EX X5322Y
FIP8106 XR 3,501,640 X370-3 [redacted]
X5005D
March 17, 1970 T. J. HARRIS 3,501,640
OPTICAL COMMUNICATION SYSTEM
Filed Jan. 13, 1967 2 Sheets-Sheet 1
FIG.1
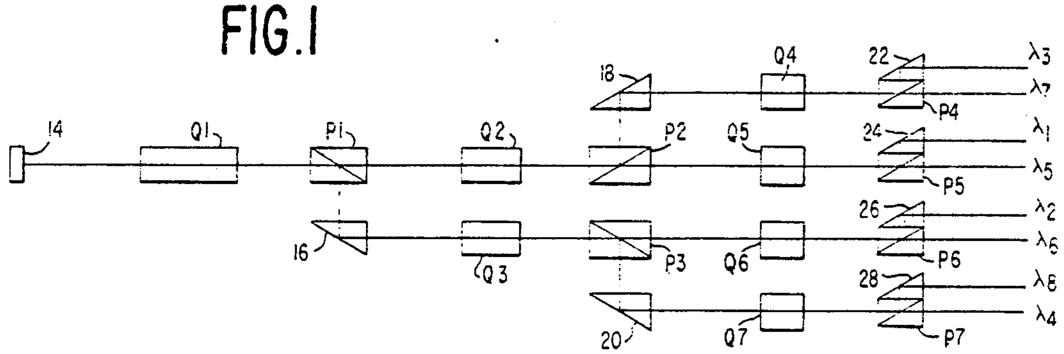
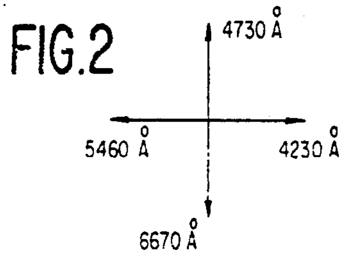
FIG.2
FIG.3
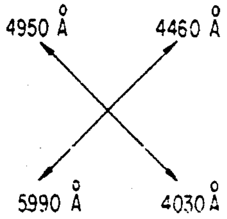
FIG.5 FIG.4 FIG.6 FIG.7
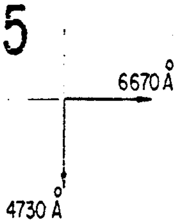
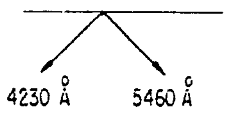
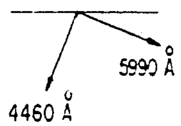
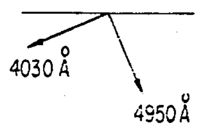
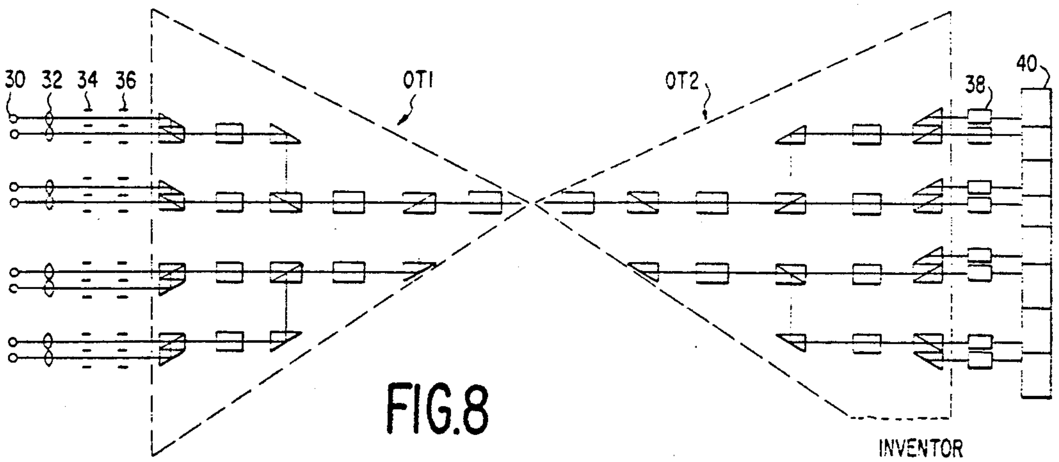
FIG.8
INVENTOR
THOMAS J. HARRIS
BY Sughrue, Rothwell, Mion, Zinn & Macpeak
ATTORNEYS 3,501,640

OPTICAL COMMUNICATION SYSTEM

Thomas J. Harris, Poughkeepsie, N.Y., assignor to International Business Machines Corporation, Armonk, N.Y., a corporation of New York Filed Jan. 13, 1967, Ser. No. 609,166
Int. Cl. H04b 9/00
U.S. Cl. 250—199 11 Claims

ABSTRACT OF THE DISCLOSURE

Apparatus for transferring large blocks of binary information from one location in a computer to another location at high speeds involving the parallel transmission of the information by a single light beam.

BACKGROUND OF THE INVENTION

The transfer of large blocks of (binary) information from one location (register) in a computer to another location (register) at high speeds has always involved serious technological problems. According to prior art devices, the problem was solved by transferring the information in parallel over cables. The advent of the laser suggested that a single light beam could be used to perform this information transfer function and techniques have been developed in which the information was converted from parallel to serial form for transmission by a laser beam.

SUMMARY OF THE INVENTION

The present invention is directed to an optical communictaion system comprising means for producing a plurality of light beams which are collimated and filtered to give the desired wavelengths, means for individually modulating each wavelength, means for combining the separate wavelengths into a single beam for transmission, receiving means adapted to split said beam into the individual wavelengths and means responsive to each modulated light wavelength to provide an output signal.

It is an object of the present invention to provide an optical communication system utilizing passive elements with the exception of the electro-optic modulators and photo protectors so that the information rate is limited only by frequency limits on the modulator or photo detectors.

A further object of the invention is to provide for the parallel transmission of information involving simultaneous two-way communication using only two optical trees and one multi-colored light beam.

Other features of the invention will be pointed out in the following description and claims and illustrated in the accompanying drawings which disclose, by way of example, the principles of the invention and the best modes which have been contemplated of applying those principles.

In the drawings:

FIGURE 1 is a schematic view of an optical tree used to split a single beam of plane polarized light having a plurality of wavelengths into a plurality of light outputs, each of which contains light of a single wavelength;

FIGURE 2 is a schematic end view of the beam of light as it leaves crystal $Q_2$ of FIGURE 1;

FIGURE 3 is a schematic end view of the light beam as it leaves crystal $Q_3$ of FIGURE 1;

FIGURE 4 is a schematic end view of the light leaving crystal $Q_4$ of FIGURE 1;

FIGURE 5 is a schematic end view of the light leaving crystal $Q_5$ of FIGURE 1;

FIGURE 6 is a schematic end view of the light leaving crystal $Q_6$ of FIGURE 1;

FIGURE 7 is a schematic end view of the light leaving crystal $Q_7$ of FIGURE 1;

FIGURE 8 is a schematic view of an optical communication system incorporating the optical tree arrangement of FIGURE 1 in the transmitter and receiver;

Figure 9:
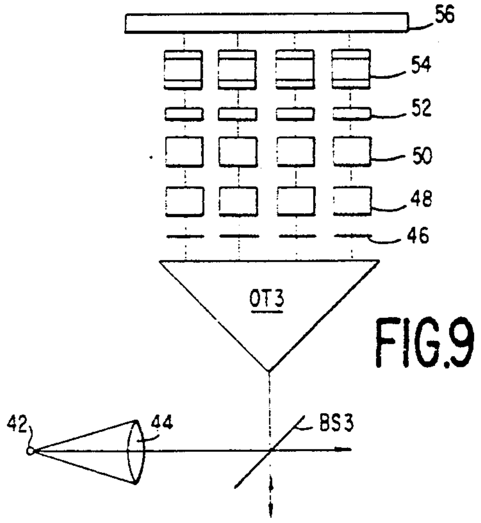
FIGURE 9 is a schematic view of a modified form of optical tree for simultaneous transmission and reception.

FIGURE 1 shows an optical tree which allows parallel transmission of information by a single light beam. The light input to the crystal $Q_1$ is provided by a suitable light source, such as a multi-color laser. The collimated input to quartz crystal $Q_1$ contains all the plane polarized wavelengths $\lambda_1$–$\lambda_8$ listed in Table I below. The polarization direction associated with each wavelength after passage through quartz crystal $Q_1$ is also shown in Table I. Note that the vibration direction associated with wavelengths $\lambda_1$, $\lambda_3$, $\lambda_5$ and $\lambda_7$ are parallel and the vibration direction associated with wavelengths $\lambda_2$, $\lambda_4$, $\lambda_6$, and $\lambda_8$ are also parallel with each other but orthogonal to the $\lambda_1$, $\lambda_3$, $\lambda_5$ and $\lambda_7$ wavelengths. The beam then enters a birefringent prism. The beam splits and wavelengths $\lambda_1$, $\lambda_3$, $\lambda_5$ and $\lambda_7$ are passed directly through the prism to quartz crystal $Q_2$. The wavelengths $\lambda_2$, $\lambda_4$, $\lambda_6$ and $\lambda_8$ are reflected at right angles with respect to the incident light beam and are subsequently reflected by an alignment prism 16 in a direction parallel to the beam of light containing wavelengths $\lambda_1$, $\lambda_3$, $\lambda_5$ and $\lambda_7$.

The two beams then enter the quartz crystals $Q_2$ and $Q_3$ which are half as long as quartz crystal $Q_1$. Table II, below, lists the wavelengths and their relative vibration direction after passage through $Q_2$ and $Q_3$. FIGURE 2 shows the relative vibration directions of wavelengths $\lambda_1$, $\lambda_3$, $\lambda_5$ and $\lambda_7$ after they pass the crystal $Q_2$ and FIGURE 3 shows the relative vibration directions of the wavelengths $\lambda_2$, $\lambda_4$, $\lambda_6$ and $\lambda_8$ after they pass through the crystal $Q_3$. Wavelengths $\lambda_1$, $\lambda_3$, $\lambda_5$ and $\lambda_7$ then enter birefringent prism $P_2$ and the beam is split with wavelengths $\lambda_1$ and $\lambda_5$ passing directly through the prism $P_2$ and wavelengths $\lambda_3$ and $\lambda_7$ being reflected by the prism $P_2$ and alignment prism 18 into parallel relationship. Wavelengths $\lambda_2$, $\lambda_4$, $\lambda_6$ and $\lambda_8$ enter birefringent prism $P_3$ and the beam is split with wavelengths $\lambda_2$ and $\lambda_6$ pasing directly through the prism $P_2$ and wavelengths $\lambda_4$ and $\lambda_8$ being reflected from the prism $P_3$ and alignment prism 20 into parallel relationship with $\lambda_2$ and $\lambda_6$. Note that the axes of prism $P_3$ must be rotated by 45° relative to prism $P_2$. Such a rotation, however, has not been shown in FIGURE 1. This condition can be corrected by introducing a half wave plate in front of $Q_3$ which has been tuned for a wavelength between 4030 A. and 5999 A. and oriented so as to rotate the polarizations of all four wavelengths by a sufficient amount (approximately 45° in this case).

The four beams now enter quartz crystals $Q_4$ through $Q_7$ which are half as long as crystals $Q_2$ and $Q_3$ or one-fourth as long as crystal $Q_1$. FIGURES 4 through 7, inclusive, show the relative orientations of the vibration directions of these wavelengths as they leave the crystals $Q_4$ through $Q_7$, respectively. These beams now enter birefringent prism beam splitters $P_4$ through $P_7$. Note that prisms $P_5$, $P_6$ and $P_7$ must be rotated relative to prism $P_4$. This situation can be corrected by using properly oriented half wave plates in front of crystals $Q_5$, $Q_6$ and $Q_7$. Reflecting prisms 22, 24, 26 and 28 are associated with each of the prisms $P_4$ through $P_7$, respectively, to reflect the reflected wavelength in a direction parallel to the passed wavelength so that all eight wavelengths are parallel to each other in spaced relation. Table III lists the wavelengths and their relative vibration directions after passage through crystals $Q_4$ through $Q_7$.

TABLE I

| Wavelength, A. | Specific Rotation, deg./mm. | Quartz Crystal Length, mm. | Polarization Orientation After Crystal |
|---|---|---|---|
| (1) 6670 | 18.0 | $Q_1$=20 | 360°=0° |
| (2) 5990 | 22.5 | 20 | 450°=90° |
| (3) 5460 | 27.0 | 20 | 540°=180° |
| (4) 4950 | 31.5 | 20 | 630°=270° |
| (5) 4730 | 36.0 | 20 | 720°=0° |
| (6) 4460 | 40.5 | 20 | 810°=90° |
| (7) 4230 | 45.0 | 20 | 900°=180° |
| (8) 4030 | 49.5 | 20 | 990°=270° |

TABLE II

| Wavelength, A. | Specific Rotation, deg./mm. | Quartz Crystal Length, mm. | Polarization Orientation After Crystal |
|---|---|---|---|
| (1) 6670 | 18.0 | $Q_2$ 10 | 180° |
| (3) 5460 | 27.0 | $Q_2$ 10 | 270° |
| (5) 4730 | 36.0 | $Q_2$ 10 | 360° |
| (7) 4230 | 45.0 | $Q_2$ 10 | 450°=90° |
| (2) 5990 | 22.5 | 10 | 225° |
| (4) 4950 | 31.5 | 10 | 315° |
| (6) 4460 | 40.5 | $Q_3$ 10 | 405°=45° |
| (8) 4030 | 49.5 | $Q_3$ 10 | 495°=135° |

TABLE III

| Wavelength, A. | Specific Rotation, deg./mm. | Quartz Crystal Length, mm. | Polarization Orientation After Crystal |
|---|---|---|---|
| (1) 6670 | 18.0 | 5 | 90° |
| (5) 4730 | 36.0 | 5 | 180° |
| (3) 5460 | 27.0 | 5 | 135° |
| (7) 4230 | 45.0 | 5 | 225° |
| (2) 5990 | 22.5 | 5 | 112.5° |
| (6) 4460 | 40.5 | 5 | 202.5° |
| (4) 4950 | 31.5 | 5 | 157.5° |
| (8) 4030 | 49.5 | 5 | 247.5° |

FIGURE 8 shows an example of a complete system. The light beams from conventional arc lamps 30 are collimated by collimating lenses 32 and filtered at 34 to give the desired wavelengths. Each wavelength is separately modulated by an electro-optic modulator 36. The separate wavelengths are then combined by means of optical tree OT1 which is similar to the optical tree described above with respect to FIGURE 1 to form a single beam for transmission. At the receiver, which is shown at the right-hand side of FIGURE 8, the beam is split up into the individual wavelengths by means of optical tree OT2 and photo detectors 38 convert the modulated light energy into electrical signals which may be stored in a register 40.

It is possible to combine the arrangement shown in FIGURE 1 with the arrangement shown in FIGURE 8 to provide the necessary light wavelengths. In this case, the light input to quartz crystal $Q_1$ in FIGURE 1 would be from a multi-color laser, such as argon or krypton. The technique shown in FIGURE 8 is not limited to eight wavelengths but can be expanded without much difficulty to thirty-two or more wavelengths. Since all the elements shown in FIGURE 8 are passive except for the electro-optic modulators and photo detectors, the information rate is limited only by frequency limits on the modulator or photo detectors.

Figure 10:
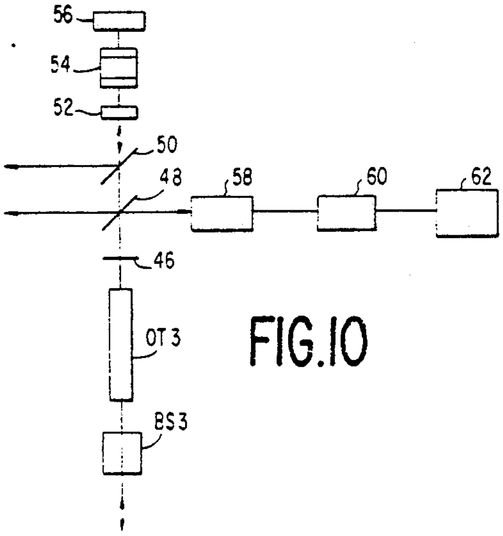
FIGURE 10 is a side view of the system shown in FIGURE 9.
Figure 11:
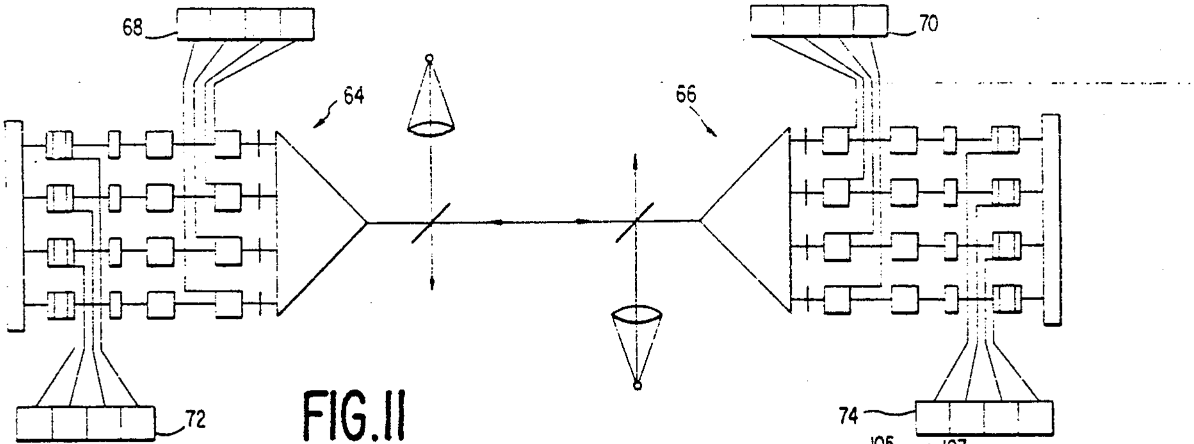
FIGURE 11 is a schematic view of a two-way optical communication system utilizing the optical tree of FIGURES 9 and 10.

Althought a two-way communication system could be established by using two arrangements similar to FIGURE 8, such a system would be unwieldly and expensive due to the large number of crystals necessary. FIGURES 9 through 11 show a modification of the optical communication system which will provide simultaneous two-way communication using only two optical trees and one multi-color light beam. Each tree is used for transmission and reception of information and represents a considerable saving of crystals, if for example, a seventy-two color system is used.

The configuration for using one tree for simultaneous transmission and reception is shown in FIGURES 9 and 10. Considering first the use of the system shown in FIGURE 9 as a transmitter, a broad band light beam emitted by the arc source 42 is collimated by lens 44 and partially (50% for example) reflected into the optical tree OT3 by beam splitter BS3. Optical tree OT3 may be identical to the optical tree shown in FIGURE 1. The crystals in OT3 spacially separate the wavelengths $\lambda_1$ through $\lambda_4$ in the beam. Four filters 46, one for each wavelength, filter out the other wavelengths present in the broad band beam. The specially separated colors are partially reflected by beam splitters 48, and partially transmitted. The transmitted beams pass through birefringent plates 50, quarter wave plates 52 and electro-optic crystals 54 to the mirror 56.

The reflected beams from mirror 56 make a second pass through the quarter wave plates 52. Two passes through a quarter wave plate causes a 90° rotation of the plane of polarization and the beam will be totally reflected out of the system by the birefringent plates 50. Thus, in the absence of signals on the electro-optic crystals, there will not be an output from OT1.

The electro-optic crystals 54 are modulated at a frequency $f_2$. The degree of modulation is not critical. If the peak modulating signals cause the electro-optic crystals 54 to act as quarter wave plates, then the beam will be totally transmitted by the birefringent plates 50 during the peak of the modulating cycle. The moduled beams are partially transmitted by the beam splitters 48 to OT3. The output from OT3 is partially transmitted by beam splitter BS3 to a receiver unit.

Turning now to FIGURE 10 which shows a side view of the device in FIGURE 9, the portion of the beams from the arc reflected by beam splitter 48 are incident on photo detectors 58. There will be a photo detector for each of the wavelengths. The output of the photo detectors is filtered by a plurality of filters 60 tuned to a frequency $2f_2$. The reflected beams are unmodulated and therefore, there will not be any output signals to the register 62.

Considering now the device of FIGURE 9 and FIGURE 10 as a receiver, the transmitted beam from a unit similar to the unit shown in FIGURE 9 is partially transmitted by beam splitter BS3 to optical tree OT3. Optical tree OT3 spacially separates the colors and they are partially reflected by beam splitters 48 to the photo detectors 58 (FIGURE 10). Since the signals are modulated at a frequency $f_2$ and contain a $2f_2$ component, they are passed by the filters 60 on the outputs of the photo detectors. These output signals are then stored in a register 62.

The portion of the received beam which is transmitted by the beam splitters 48 passes through the birefringent plates 50, the quarter wave plates 52 and the electro-optic crystals 54 to the mirror 56. If no signals are present on the electro-optic crystals, the beams reflected by the mirror are totally reflected out of the system by the birefringent plates 50.

If a unit, such as the unit shown in FIGURES 9 and 10, is transmitting and receiving simultaneously, there may exist a possibility that some of the received signal from another unit will be reflected back to the receiver section of the unit. The frequencies $f_1$ and $f_2$ must be selected so that the intermodulation components generated in the modulators do not contain any undesired frequencies.

FIGURE 11 shows two units 64 and 66, each of which is similar to the unit shown and described above with respect to FIGURES 9 and 10, which are combined to form a system capable of simultaneous two-way communication. The receiver register 68 is adapted to receive the modulated wavelengths from unit 56 and the receiver register 70 is adapted to receive the modulated wavelengths from the unit 64. The transmitter register controls the electro-optic crystals to modulate the wavelengths which will be transmitted from the unit 64. The transmitter register 74 is adapted to apply the signals to the electro-optic crystals to modulate the signal sent from the unit 66.

Figure 12:
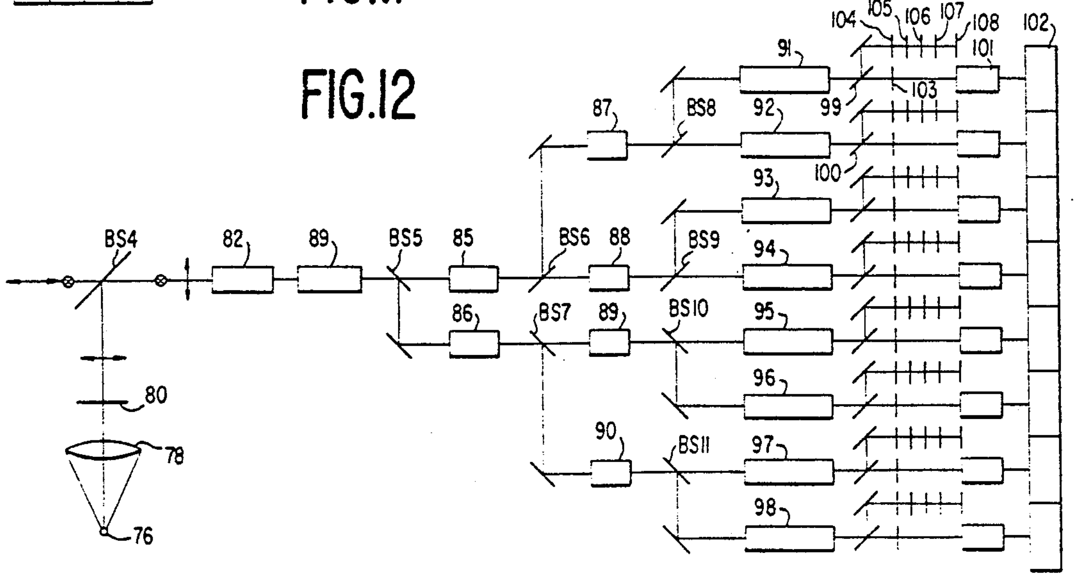
FIGURE 12 is a schematic view of a modified optical tree adapted for use in a simultaneous two-way transmission and receiving system.

Turning now to FIGURE 12, a system is disclosed which is based on the use of orthogonal polarizations to separate received and transmitted signals. This technique eliminates the beam splitters and their associated losses and the need for different modulating frequencies for the transmitted and received beams such as are necessary with the device shown in FIGURES 9 through 11. The system shown in FIGURE 12 therefore, is more efficient and simpler than the one described above with respect to FIGURES 9 through 11. An eight color system($\lambda_1$–$\lambda_8$) is shown in FIGURE 12. Light from the source 76 is collimated by the lens 78 and is polarized in the plane of the drawing by means of the polarizer 80. The polarized light is then reflected by the birefringent beam splitter BS4. The received light coming from another station similar to the station shown in FIGURE 12 is passed by the beam splitter BS4 and is polarized perpendicular to the plane of the drawing. Therefore, the received light and the source light after the beam splitter BS4 are polarized at 90° with respect to each other. Both beams then enter a Faraday rotator 82 and the plane of polarization of both beams are rotated by 45°. The two beams, however, remain polarized with respect to each other at 90°.

The polarization direction of each color is rotated after passage through quartz crystal 84. Wavelengths $\lambda_1$, $\lambda_3$, $\lambda_5$ and $\lambda_7$ from source 76 are passed by birefringent plate BS5 and wavelengths $\lambda_2$, $\lambda_4$, $\lambda_6$ and $\lambda_8$ from the source 76 are reflected. Note that the system of beam splitters and crystals after quartz crystal 84 are rotated by 45° from the plane of the drawing.

The wavelengths associated with the received beam, that is, the beam from a unit similar to the unit shown in FIGURE 12, are orthogonal to the corresponding wavelengths in the beam from the source 76. Therefore, wavelengths $\lambda_2$, $\lambda_4$, $\lambda_6$ and $\lambda_8$ of the received beam are passed by the birefringent plate BS5 and wavelengths $\lambda_1$, $\lambda_3$, $\lambda_5$ and $\lambda_7$ are reflected. The passed beam is then directed through the quartz crystal 85 and the reflected beam is directed through the quartz crystal 86. Subsequent to leaving the quartz crystals 85 and 86, the beams impinge upon the birefringent plates BS6 and BS7, respectively. The source wavelengths $\lambda_1$ and $\lambda_5$ are passed by by the birefringent plate BS6, as well as the received wavelengths $\lambda_4$ and $\lambda_8$ to the quartz crystal 88. The reflected source wavelengths $\lambda_3$ and $\lambda_7$ and the reflected received wavelengths $\lambda_2$ and $\lambda_6$ are directed to the quartz crystal 87. The source wavelengths $\lambda_2$ and $\lambda_6$ and the received wavelengths $\lambda_1$ and $\lambda_5$ which were passed by the birefringent plate BS7 are directed to the quartz crystal 89. The reflected source wavelengths $\lambda_4$ and $\lambda_8$ and the reflected received wavelengths $\lambda_3$ and $\lambda_7$ are directed to the quartz crystal 90.

The birefringent plate BS8 then separates the beam into source wavelength $\lambda_3$ and received wavelength $\lambda_2$ which are reflected to the quartz crystal 91. Source wavelength $\lambda_7$ and received wavelength $\lambda_6$ are passed by the birefringent plate BS8 to the quartz crystal 92. After rotation by the crystals 91 and 92, the source wavelength and the received wavelengths are then separated by the birefringent plates 99 and 100. Wavelength $\lambda_2$ of the received beam is passed by the plate 99 and is directed through a filter 103 to a photo detector 101. The detected signal is then stored in the corresponding register location 102. Wavelength $\lambda_3$, which is reflected by the plate 99, is then passed through a filter 104, an analyzer 105, quarter wave plate 106, and an electro-optic crystal 107 to a mirror 108. In the absence of a signal on the electro-optic crystal 107, the reflected light from the mirror 108 will make a second pass through the quarter wave plate 106 and be blocked by the analyzer. If a signal is present on the electro-optic crystal 107, an amount of light proportional to the signal will be passed by the analyzer 105. This light returns through the optical tree and enters the Faraday rotator 82 where the polarization direction is rotated an additional 45° after passage through the rotator. The light then emerges, from the rotator 82 and is passed by the polarization sensitive beam splitter BS4 for transmission to another terminal.

While only the details of the wavelengths $\lambda_3$ from the source light and $\lambda_2$ from the received light have been treated in detail, it is obvious that the other source wavelengths and received wavelengths are handled in the same manner. Thus the system shown in FIGURE 12 can be used to simultaneously transmit and receive light beams containing eight colors. The number of colors chosen is merely an example and more or less colors (wavelengths) can be used.

Obviously, many modifications and variations of the present invention are possible in the light of the above teachings. It is, therefore, to be understood that within the scope of the appended claims, that the invention may be practiced otherwise than as specifically described.

What is claimed is:

1. An optical communication system comprising light source means for producing a plurality of wave lengths, modulating means for modulating each of said individual wave lengths, transmission means for combining said modulated individual wave lengths into a single transmission beam, receiver means adapted to separate said transmission beam into individual wave length beams, said transmission means and said receiver means each being comprised of an optical tree means for combining and separating said individual wave lengths respectively, having at least one polarization control means and at least one polarization responsive beam positioning control means, and detector means responsive to each modulated light wave length to provide an output signal.

2. A two-way optical communication system comprising two identical transmission and receiving stations each of which is provided with light source means for producing a plurality of wavelengths, modulating means for modulating each of said individual wavelengths, transmission means for combining said modulated individual wavelenghts into a single transmission beam for transmission to the other station, receiver means adatped to separate a transmission beam received from said other station into individual wavelength beams and detector means responsive to each received modulated light wavelength to provide an output signal.

3. A two-way optical communication system comprising two similar transmission and receiving stations each of which is comprised of means for producing a light beam having a plurality of wavelengths, means for controlling the spacial relation to said wavelengths relative to each other, means for modulating the wavelengths at each station at different frequencies and means at each station adapted to detect only the frequency modulated wavelengths transmitted by the other station and produce an output signal.

4. A two-way optical communication system comprising two identical transmission and receiving stations each of which is comprised of an optical tree means for controlling the spacial relation of a plurality of light wavelengths, light source means for producing a light beam having a plurality of wavelengths, means directing said beam into the optical tree means of one of said stations to spacially separate said beam into a plurality of parallel beams each hving a single wavelength, reflecting means adapted to reflect said parallel beams back to said optical tree to recombine said wavelengths into a single beam for transmission to the other of said stations, modulating means intermediate said optical tree means and said reflecting means for selectively modulating said wavelengths, deflecting means located between said optical tree means and said modulating means to deflect the transmitted beam received from said other station subsequent to the separation of said received beam into individual spaced parallel wavelengths at said one station by the optical tree means thereof, detector means for detecting said deflected light wavelengths and adapted to produce output signals, filter means adapted to pass only those signals modulated at a predetermined frequency and register means for storing those signals passed by said filter means.

5. A two-way optical communication system according to claim 4 wherein the optical tree means at each station is comprised of at least one light polarization control means and at least one polarization responsive light beam position control means.

6. A two-way optical communication system as set forth in claim 4 further comprising quarter wave plate means intermediate said deflecting means and said modulating means and birefringent crystal means intermediate said deflecting means and said quarter wave plate means whereby those light wavelengths from said source means which are not modulated by said modulating means are deflected out of said system.

7. A two-way optical communication system comprising two identical transmission and receiving stations, each station having a light source means adapted to provide a beam of plane polarized light orthogonal to and coincident with the beam of light received from the other of said stations, optical tree means adapted to separate the wavelengths of said received beam and said source beam into their individual wavelengths as separate spaced parallel beams, means for reflecting and modulating the wavelengths of said source beam back through said optical tree to recombine said wavelengths for transmission to said other station and means for detecting the wavelengths of said received beam and producing an output signal therefrom.

8. A two-way optical communication system as set forth in claim 7 wherein said optical tree means comprises at least one stage having control means for controlling the polarization direction of the wavelengths of said received beam and said source beam such that half the received wavelengths and half the source wavelengths are orthogonal to the other half of said source wavelengths, polarization responsive means separating the orthogonally related wavelengths subsequent to said control means into two spaced parallel beams and a final stage similar to said one stage for separating each received wavelength from its companion source wavelength.

9. A two-way optical communication system as set forth in claim 7 further comprising Faraday rotator means located in advance of said optical tree means in the path of said received beam and said source beam.

10. A beam splitting device adapted to separate a beam of plane polarized light having a plurality of wavelengths into a plurality of spaced parallel beams each having a single wavelength comprising at least one stage having polarization control means and polarization responsive separating means adapted to separate said beam into a pair of spaced parallel beams.

11. A beam splitting device as set forth in claim 10 wherein a plurality of said stages are arranged in sequence such that each of the spaced parallel beams will have only a single wavelength.

References Cited

UNITED STATES PATENTS 3,256,443 6/1966 Moore ............ 250—199

RODNEY D. BENNETT, Jr., Primary Examiner

CHARLES E. WANDS, Assistant Examiner

U.S. Cl. X.R.

350—150, 157